US008433979B2

(12) United States Patent
Blaum et al.

(10) Patent No.: US 8,433,979 B2
(45) Date of Patent: Apr. 30, 2013

(54) NESTED MULTIPLE ERASURE CORRECTING CODES FOR STORAGE ARRAYS

(75) Inventors: Mario Blaum, San Jose, CA (US); James L. Hafner, San Jose, CA (US); Steven R. Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/036,845

(22) Filed: Feb. 28, 2011

(65) Prior Publication Data

US 2012/0221926 A1 Aug. 30, 2012

(51) Int. Cl.
  *G11C 29/00* (2006.01)
(52) U.S. Cl.
  USPC .............................. 714/770; 714/5
(58) Field of Classification Search .......... 714/770, 714/5
  See application file for complete search history.

(56) References Cited

U.S. PATENT DOCUMENTS

| 5,751,730 | A * | 5/1998 | Mourot .......................... 714/755 |
| 5,862,158 | A * | 1/1999 | Baylor et al. .................. 714/800 |
| 6,851,082 | B1 * | 2/2005 | Corbett ......................... 714/770 |
| 6,973,613 | B2 | 12/2005 | Cypher | |
| 7,062,604 | B1 | 6/2006 | Nanda | |
| 7,073,115 | B2 | 7/2006 | English et al. | |
| 7,093,159 | B1 | 8/2006 | Nanda | |
| 2005/0278568 | A1 | 12/2005 | Delaney | |
| 2006/0074995 | A1 | 4/2006 | Hafner et al. | |
| 2006/0129873 | A1 * | 6/2006 | Hafner .............................. 714/5 |
| 2009/0006923 | A1 | 1/2009 | Gara et al. | |
| 2009/0013233 | A1 | 1/2009 | Radke | |
| 2010/0115335 | A1 * | 5/2010 | Wylie et al. ..................... 714/25 |

FOREIGN PATENT DOCUMENTS

| WO | WO0161491 A1 | 8/2001 |
| WO | WO0208900 | 1/2002 |
| WO | WO2004040450 A1 | 5/2004 |

OTHER PUBLICATIONS

International Search Report & Written Opinion for PCT/IB2012/050605 dated Jul. 12, 2012.

Chih-Shing Tau et al.; "Efficient Parity Placement Schemes for Tolerating Triple Disk Failures in RAID Architectures"; Proceedings of the17th International Conference on Advanced Information Networking and Applications (AINA•03) 0-7695-Downloaded on May 4,2010 at 17:41:18 UTC from IEEE Xplore.

Chong-Won Park et al.; "A Multiple Disk Failure Recovery Scheme in RAID Systems" Journal of Systems Architecture 50 (2004) 169-175.

(Continued)

*Primary Examiner* — M. Mujtaba K Chaudry
(74) *Attorney, Agent, or Firm* — Cantor Colburn LLP

(57) ABSTRACT

Embodiments of the invention relate to storing data in a storage array. An aspect of the invention includes receiving write data. The write data is arranged into "r" rows and "n" columns of pages, with each page including a plurality of sectors. The write data is encoded using a plurality of horizontal and vertical erasure correcting codes on the pages. The encoding allows recovery from up to $t_r$ erasures in any one of the r rows, up to $t_{r-1}$ erasures in any one of the remaining r−1 rows, up to $t_{r-2}$ erasures in any one of the remaining r−2 rows, and so on, such that the encoding allows recovery from up to $t_1$ erasures in the last remaining row. Encoded write data is output from the encoding. The encoded write data is written as a write stripe across n storage devices in a storage array.

5 Claims, 6 Drawing Sheets

OTHER PUBLICATIONS

Haruhiko Kaneko et al.; "Three Level Error Control Coding for Dependable Solid State Drives"; Downloaded on May 4, 2010 at 17:21:31 UTC from IEEE Xplore. Restrictions apply. 2008 14th IEEE Pacific Rim International Symposium on Dependable Computing; pp. 1-8.

Jehan-Francois Paris et al.; Using Storage Class Memories to Increase the Reliability of Two-Dimensional RAID Arrays; Downloaded on May 4, 2010 at 15:50:45 UTC from IEEE Xplore.

Kwanghee Park et al.; Reliability and Performance Enhancement Technique for SSD Array Storage System using RAID Mechanism; Downloaded on May 4, 2010 from IEEE Xplore; pp. 140-146.

Nam-Kyu Lee et al.; "Efficient Parity Placement Schemes for Tolerating up to Two Disk Failures in Disk Arrays"; Journal of Systems Architecture 46 (2000) 1383-1402.

* cited by examiner

|  | Col 0 | Col 1 | Col 2 | Col 3 | Col 4 |
|---|---|---|---|---|---|
| Row 0 | $a_{00}$ | $a_{01}$ | $a_{02}$ | $a_{03}$ | $p_{04}$ |
| Row 1 | $a_{10}$ | $a_{11}$ | $a_{12}$ | $a_{13}$ | $p_{14}$ |
| Row 2 | $a_{20}$ | $a_{21}$ | $a_{22}$ | $p_{23}$ | $p_{24}$ |

FIG. 3

NESTED MULTIPLE ERASURE CORRECTING CODES FOR STORAGE ARRAYS

BACKGROUND

The present invention relates generally to storage systems, and more specifically, to nested multiple erasure correcting codes for storage arrays.

Computer systems utilize data redundancy schemes such as parity computation to protect against loss of data on a storage device. In redundant arrays of independent disks (RAID) systems, data values and related parity values are striped across disk drives. RAID systems are typically used to protect information stored in hard disk drives (HDDs) arrays from catastrophic disk failures. Two popular RAID schemes are RAID 5 which protects against a single catastrophic disk failure and RAID 6 which protects against a double catastrophic disk failure.

Flash devices are a type of non-volatile storage devices that can be electrically erased and reprogrammed in large blocks. Like HDDs, flash devices divide the medium into sectors that are typically 512 bytes. Flash devices further collect sectors into pages with typically eight sectors per page, so that each page contains four thousand or 4 kilo (K) bytes. Each sector is protected by an error correcting code (ECC) that corrects a number of errors (typically, single-bit errors, although other possibilities, like byte errors, are also feasible). A popular choice is a Bose-Chaudhuri-Hocquenghem (BCH) code, like an eight bit correcting or fifteen bit correcting BCH code, although many variations are possible. As in HDDs, pages in flash devices may suffer hard errors (HEs). This occurs, for example, when the error correcting capability of the BCH code in a sector of the page is exceeded. As compared to HDDs, exceeding the capability of the BCH code is more likely in flash devices, both as a page nears the end of its write endurance lifetime, or as a page nears the end of its data retention lifetime. Thus, the number of HEs in flash devices may be expected to grow over time, leaving latent HEs on a device.

An array made up of flash devices may encounter a mix of catastrophic device failures combined with possibly more prevalent HEs. For example, use of RAID 5 for protecting information stored in flash devices may result in a device failure when there are latent HEs. Therefore, if a device in a RAID 5 system experiences a catastrophic device failure, and some other device has a HE in a page, the row where such an event occurs will be unable to retrieve the information. RAID 6 requires dedicating an entire second device for parity, which is expensive when the predominant failures are HEs.

BRIEF SUMMARY

An embodiment is a system for storing data in a storage array. The system includes a storage array and an array controller. The storage array includes a plurality of storage devices. The array controller is configured for receiving write data and for arranging the write data in r rows and n columns of pages. The array controller encodes the write data using a plurality of horizontal and vertical erasure correcting codes on the pages. The encoding results in a first that row contains $t_1$ parity pages with $t_1 \geq 1$, a second row that contains $t_2$ parity pages with $t_2 \geq t_1$, a third row that contains $t_3$ parity pages with $t_3 \geq t_2$, and so on, up to an rth row that contains $t_r$ parity pages with $t_r \geq t_{r-1}$ and $n > t_r > t_1$. The encoding allows recovery from up to $t_r$ erasures in any one of the r rows, up to $t_{r-1}$ erasures in any one of the remaining r−1 rows, up to $t_{r-2}$ erasures in any one of the remaining r−2 rows, and so on, such that the encoding allows recovery from up to $t_1$ erasures in the last remaining row. Output from the encoding includes encoded write data. The array controller writes the encoded write data as a write stripe across n storage devices in a storage array.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 illustrates contents of an encoded block in accordance with an embodiment;

DETAILED DESCRIPTION

Figure 1:
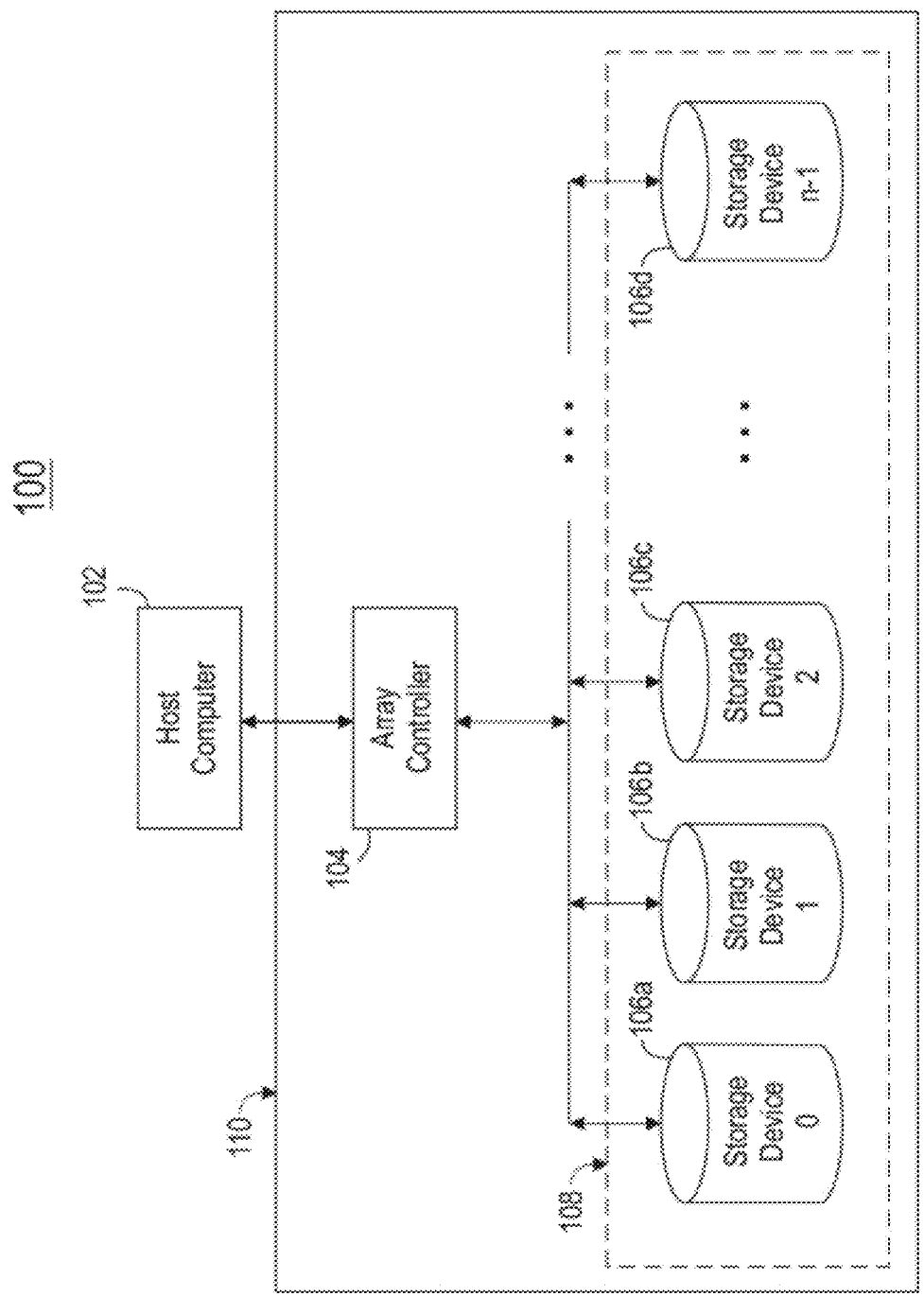
FIG. 1 illustrates a block diagram of a system for providing multiple erasure correcting codes in accordance with an embodiment.

An embodiment utilizes a multiple erasure correcting code for protecting against data loss occurring as a combination of a device failure and a block failure in a storage system. A nested erasure code that can tolerate multiple erasures and that has an overall outer parity that is one erasure tolerant is utilized by an embodiment. The nested property is characterized by each redundancy symbol being computed over the data and all previous computed redundancy symbols. In the case where a single device fails, an embodiment described herein provides protection comparable to RAID 6, but with storage efficiency approaching that of RAID 5.

As used herein, the term "erasure correction" refers to correcting an error whose location is known. An erasure correction is different than an "error correction" which, as used herein, refers to correcting an error whose location is not known. Correcting erasures requires about half of the amount of redundancy that is required to correct errors. As used herein, the term "hard error" or "HE" refers to an erasure (i.e., an error with a known location).

While error correcting codes (ECCs), such as the Bose-Chaudhuri-Hocquenghem (BCH) code, help reduce a raw bit error rate in a flash device to a lower level after correction, the final level may still be higher than a target raw bit error rate for the storage system. For example, a fifteen bit correcting BCH code may bring down a raw bit error rate of 0.001 to a raw bit error rate of $2.7e^{-9}$ after decoding a 512 byte (B) sector. However, this raw bit error rate, which represents the probability of a HE in a flash device, is substantially higher than that of a typical hard disk drive (HDD), which may range from $8e^{-14}$ to $8e^{-16}$. Higher error rates are likely to occur near the end of write endurance as well as near the end of the data retention life in a flash device.

When the error correcting capability of an ECC is exceeded, this event will be detected with a very high probability. For example, if a fifteen bit correction BCH code has been implemented and more than fifteen errors have occurred, it is very likely that the BCH code itself will detect such an event. In any case, a cyclical redundancy code (CRC) is generally added in order to assure that the probability of miscorrection is of the order of $1e^{-26}$ or so. A BCH code failing to detect a miscorrection is symptomatically equivalent to an HDD dropped write or off-track write.

Any multiple erasure correcting code known in the art may be utilized by an embodiment. One example of a multiple erasure code utilized by an embodiment is a Reed-Solomon (RS) code. RS codes are well known in the art and can be used to correct a plurality of erasures. RS codes are based on symbols, with the size of the symbols depending on the application. For a tutorial on RS codes that is relevant to RAID architectures, see J. S. Plank "A Tutorial on Reed-Solomon Coding for Fault-Tolerance in RAID-like Systems", *Software, Practice & Experience*, 995-1012, September 1997.

Another family of efficient codes for correction of a plurality of erasures is given by the Blaum-Roth 93 (BR93) codes, as described in M. Blaum et al., New Array Codes for Multiple Phased Burst Correction", IEEE Transactions on Information Theory, vol. 39, pp. 66-77 1993. BR93 codes are array codes that tend to be less complex than RS codes by avoiding Galois field operations and doing only exclusive-or (XOR) operations instead.

Both the RS and BR93 codes are maximum distance separable (MDS) codes, meaning that they make optimal use of the redundancy in order to correct erasures. RS and BR93 codes are examples of two types of multiple erasure correcting codes that may be utilized by embodiments described herein. Embodiments are not limited to these two codes as other families of codes may also be implemented such as a generalized EVENODD code or a generalized row diagonal code (RDC).

FIG. 1 illustrates a block diagram of a system 100 that is protected using multiple erasure correcting codes in accordance with an embodiment. As shown in FIG. 1, a host computer 102 is in communication with an array controller 104 in a storage system 110. The storage system 110 stores data in a storage array 108 made up of N storage devices 106 (where N is greater than one): storage device zero 106a, storage device one 106b, storage device two 106c, through storage device N−1 106d. In an embodiment, parity bits are stored in the storage devices 106 along with host data (e.g., represented as data bits). In an embodiment, the storage devices 106 in the storage array 108 are implemented by flash devices. In an embodiment, the array is made up of five flash devices, each device having a 32 Gigabyte (G) storage capacity.

As shown in FIG. 1, the array controller 104 is part of the storage system 110; in another embodiment, the array controller 104 is part of the host computer 102.

Figure 2:
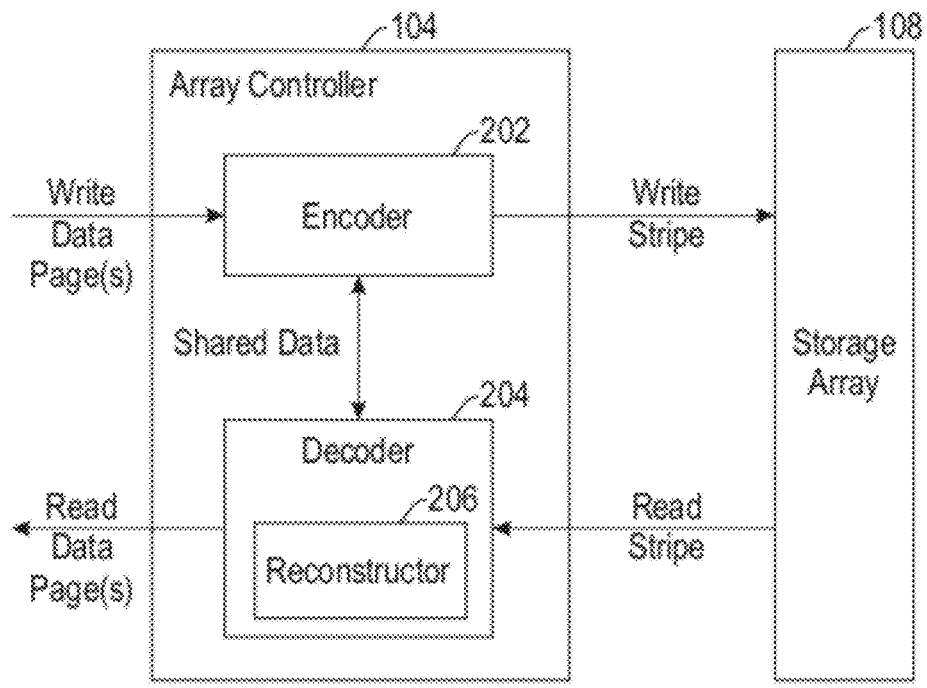
FIG. 2 illustrates a storage system in accordance with an embodiment.

FIG. 2 illustrates the storage system 110 of FIG. 1 in accordance with an embodiment. The storage system 110 may include numerous other elements such as receivers, transmitters, and clocks as known by those of ordinary skill in the art, which are not illustrated for purposes of clarity. As shown in FIG. 2, the array controller 104 includes an encoder 202 and a decoder 204. The encoder 202 is utilized during a write process for receiving one or more write data pages (e.g., from the host computer 102) and generating a write stripe, which includes both data pages and parity pages. In an embodiment, the write stripe is written in the storage array 108 and spans a plurality of rows in the storage array 108. The decoder 204 is utilized during a read process for reading one or more data pages from the storage array 108. When one or more HEs in a page are detected, the decoder reads the whole stripe where the HE(s) has been detected from the storage array 108. The decoder 204 and the encoder 202 both have access to shared data (e.g., data to identify the type of encoding that was applied by the encoder 202 to the write pages to generate the write stripe). The read stripe contains parity bits that are removed by the decoder 204 to generate the read data pages. The decoder 204 includes a reconstructor 206 that is used when a read failure of at least one page has occurred. A read failure occurs, for example, when the error correcting capability of the internal ECC of a page has been exceeded. Typically, the locations of the pages in error are known and thus, the error locations (e.g., the erased page location(s)) and the read stripe are sent to the reconstructor 206, which attempts to retrieve the erased pages.

FIG. 3 depicts contents of a portion of an array stored across a plurality of storage devices 106 (also referred to herein as a "stripe") that may be encoded by the encoder 202 using a multiple erasure correcting code. As used herein, the term "page" refers to a group of memory cells. In an embodiment a page is 4K bytes, however other page sizes may also be implemented by other embodiments. As used herein, the term "encoding stripe" refers to a group of pages that together make up a write stripe and that are encoded with the multiple erasure correcting code as a unit. As used herein, the term "decoding stripe" refers to a group of pages that together make up a read stripe and that are decoded with the multiple erasure correcting code as a unit.

The stripe depicted in FIG. 3 includes a block of pages arranged in three rows and five columns. In an embodiment, each column represents a portion of a storage device. In the stripe depicted in FIG. 3, each location represents a page in a flash memory device. As shown in FIG. 3, four pages are parity pages that contain parity bits (pages labeled $p_{04}$, $p_{14}$, $p_{24}$, and $p_{23}$) and the remaining pages are data pages that contain data bits (pages labeled $a_{00}$, $a_{10}$, $a_{20}$, $a_{01}$, $a_{11}$, $a_{21}$, $a_{02}$, $a_{12}$, $a_{22}$, $a_{03}$, and $a_{13}$). It is assumed that an ECC (e.g., BCH) or a CRC are used to detect that a page read failure has occurred and to identify any erasure locations. Embodiments described herein assume that a read failure has been reported, regardless of the method used to identify such read failure.

The arrangement of the data pages and the parity pages in the stripe of FIG. 3 to be described below allows for recovery of up to one HE in any two of the rows together with two HEs in the remaining row. One could also use a four-erasure correcting code allowing for recovery of any four HEs in the stripe, but at higher complexity, since a three row stripe is given here only for the sake of example. Typical stripes in applications involve sixteen or even thirty-two rows.

The placement of the parity pages may vary from correction stripe to correction stripe. Although the parity pages can be placed anywhere in the stripe, in general it is preferable to place them in different devices from stripe to stripe in order to avoid bottleneck effects. The stripe depicted in FIG. 3 is an illustration of an example stripe only as the number of rows and columns in a stripe can be arbitrary. In addition, the placement of the parity pages is arbitrary and they may be placed in other locations than those shown in FIG. 3. Further, the number of parity pages can vary depending on the recovery required. The stripe in FIG. 3 can be repeated indefinitely vertically, depending on the size of the storage devices. For example, if the storage devices are 32G flash devices and the number of rows is equal to sixteen, then the encoding stripe is repeated 500,000 times.

In an embodiment, the decoder 204 receives a read stripe that has experienced page HEs from the storage array 108 that has been encoded in the manner shown in FIG. 3. As an example, it is assumed that the second storage device corresponding to pages $a_{01}$, $a_{11}$, and $a_{21}$ has suffered a catastrophic failure and that an additional HE has occurred in page $a_{13}$. These four page erasures can be recovered using the stripe configuration illustrated in FIG. 3 along with the decoding scheme to be described below. In an embodiment, the recovery is performed by the reconstructor 206 located in the decoder 204.

Figure 4:
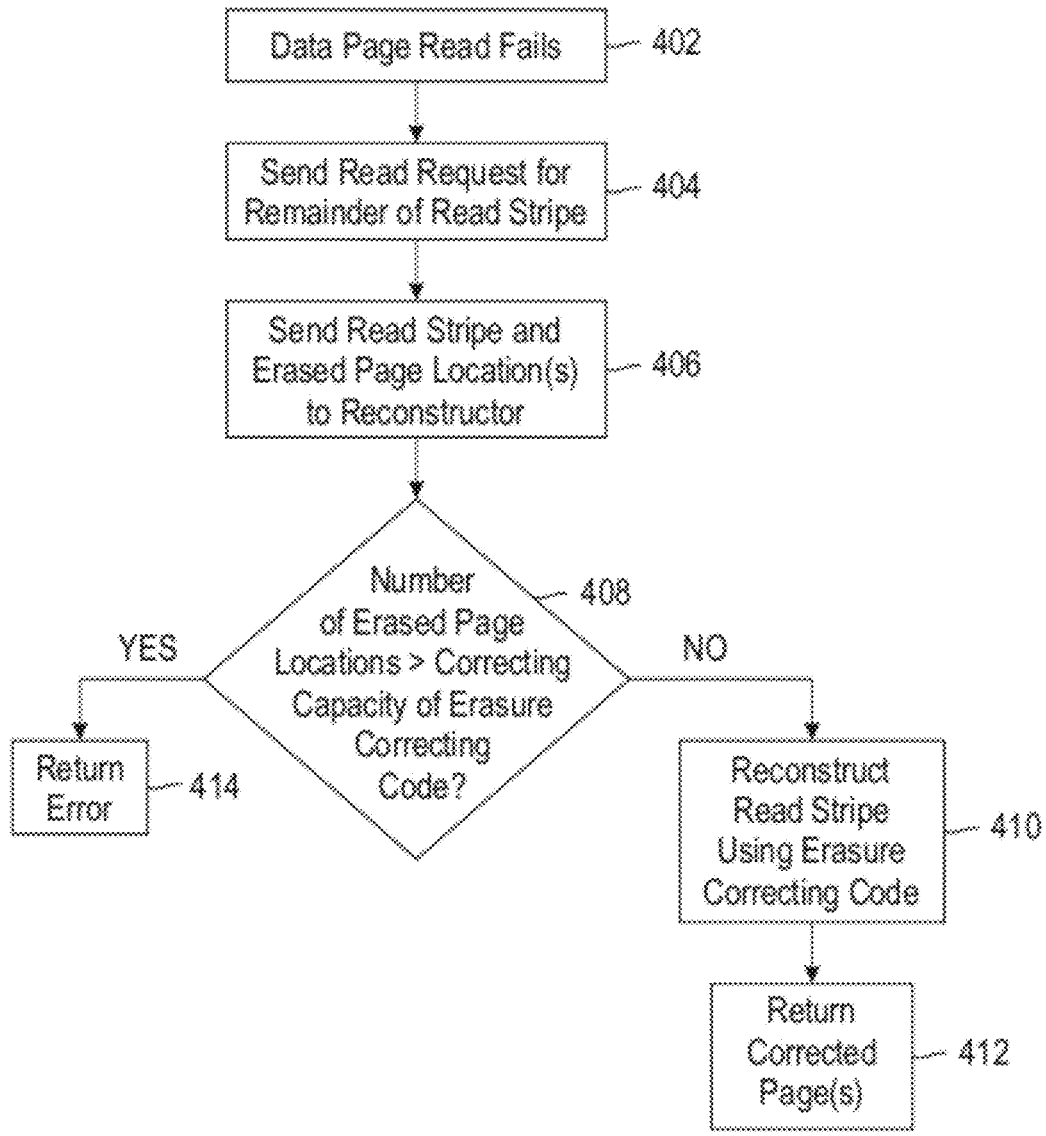
FIG. 4 is a process flow for performing erasure correction in accordance with an embodiment.

FIG. 4 depicts a process flow implemented by the decoder 204 in accordance with an embodiment. At block 402, the ECC and/or the CRC detect that a page read has failed. At block 404, a request is sent to read all the pages in the stripe that contains the page where the read page has failed. At block 406, the read stripe together with the location(s) of the page(s) where the read has failed (i.e., the erased page location(s)) are sent to the reconstructor 206. At block 408, it is determined if the number of erased page locations in the read stripe is greater than the erasure correction capability of the scheme. For instance, if a row contains three erasures, the erasure correction capability of the scheme is exceeded. In the example of FIG. 3, this occurs also when two rows contain two erasures each. If it is determined at block 408, that the number of erased page locations in the read stripe is greater than the capability of the scheme, then block 414 is performed to return an error condition to the decoder 204. If it is determined at block 408, that the number of erased page locations is within the capacity of the scheme, then block 410 is performed. At block 410, the read stripe is reconstructed using the scheme involving erasure correcting codes as described herein below. At block 412, the reconstructor 206 outputs the recovered read stripe including the recovered read page to the decoder 204.

Figure 5:
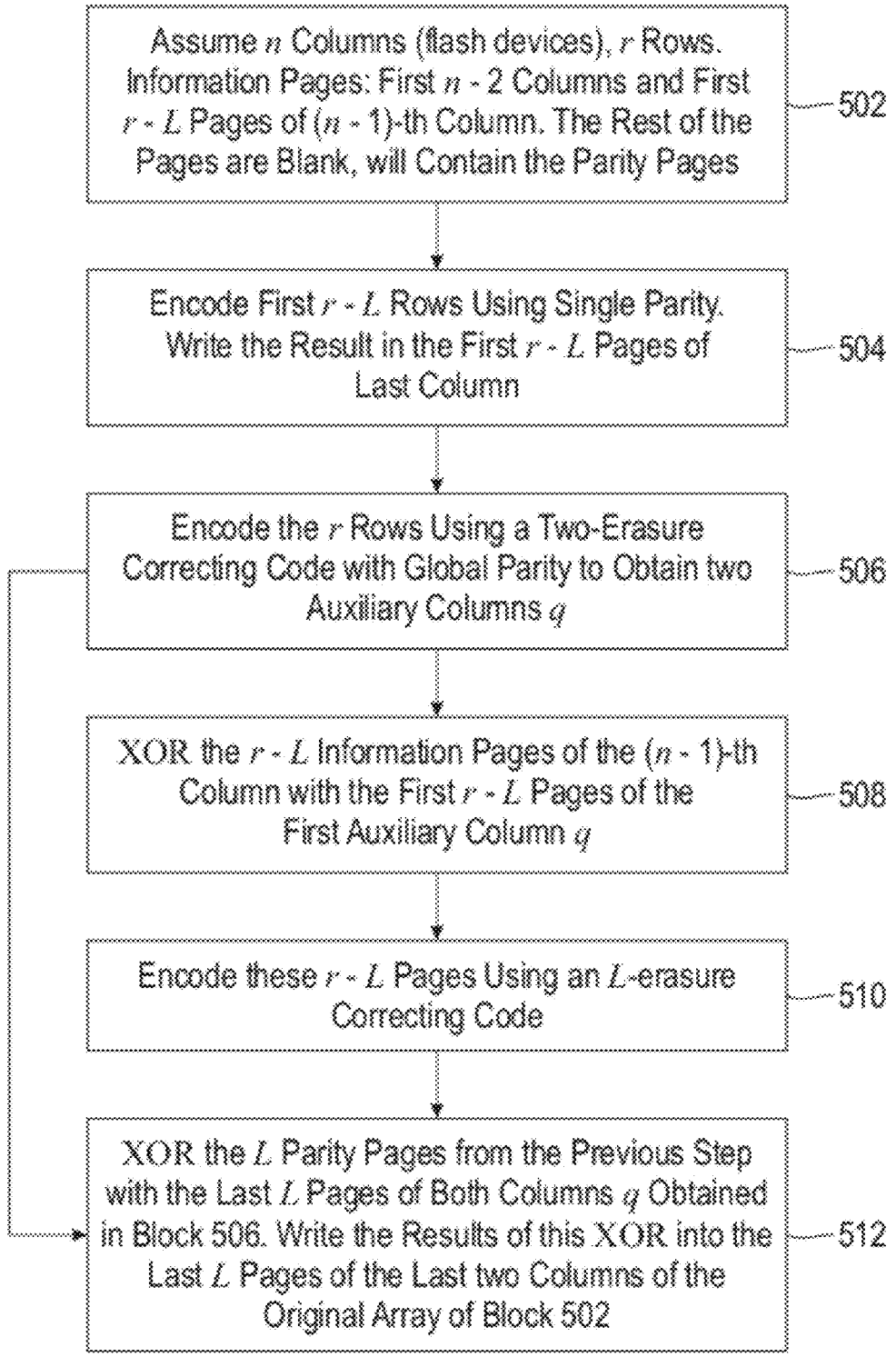
FIG. 5 is a process flow for encoding a write stripe in accordance with an embodiment.

FIG. 5 is a process flow for encoding a write stripe in accordance with an embodiment. In an embodiment, the process flow depicted in FIG. 5 is performed by the encoder 202. It will be described in reference to a (1,1,2) erasure correcting scheme as the one of FIG. 3 (the array has three rows, two may be corrected for one erasure and one may be corrected for two erasures) but may be expanded to cover other erasure correcting schemes. At block 502, it is assumed that there are "n" columns (e.g., flash devices), "r" rows, and "L" rows having the capability of being corrected for up to two erasures. In addition, it is assumed that the first "n−2" columns and first "r−L" pages of the (n−1)th column contain data. The rest of the pages in the array are blank and will contain parity pages.

In the example in FIG. 3, there are five columns (n=5), three rows (r=3), and L=1. Data pages are represented as "a", parity pages as "p", unused pages as "b" and temporary pages as "q" or "c". The subscripts next to each page type represent the position of the page in the array (e.g., "$a_{00}$" is a data page at row 0, column 0 in the matrix). The symbol "+" represents an XOR operation. The encoding in this embodiment allows recovery from one failure in any two of the rows and from two failures in the remaining row. The description that follows shows one way to obtain the parity pages from the data pages in accordance with an embodiment. The array below shows the locations of the eleven data pages.

| $a_{00}$ | $a_{01}$ | $a_{02}$ | $a_{03}$ | $b_{04}$ |
| $a_{10}$ | $a_{11}$ | $a_{12}$ | $a_{13}$ | $b_{14}$ |
| $a_{20}$ | $a_{21}$ | $a_{22}$ | $b_{23}$ | $b_{24}$ |

At block 504, the first "r−L" rows are encoded using single parity. The results are written in the first "r−L" pages of the last column.

In this embodiment, the parity of the first two rows is obtained using single parity. In an embodiment, the parity is obtained by XORing the data pages in the first row to obtain $p_{04}$ and by XORing the data pages in the second row to obtain $p_{14}$.

| $a_{00}$ | $a_{01}$ | $a_{02}$ | $a_{03}$ | $p_{04}$ |
| $a_{10}$ | $a_{11}$ | $a_{12}$ | $a_{13}$ | $p_{14}$ |
| $a_{20}$ | $a_{21}$ | $a_{22}$ | $b_{23}$ | $b_{24}$ |

At block 506, the R rows are encoded using a two-erasure correcting code with global parity to obtain two auxiliary columns q. An embodiment of how to construct an erasure correcting code with global parity is described herein below.

In the first two (in general, r−L) rows it is enough to compute the first parity symbol of the aforementioned two-erasure correcting code. This first parity symbol of such two-erasure correcting code is denoted by $q_{03}$ in the first row, $q_{13}$ in the second and $q_{23}$ in the third.

| $a_{00}$ | $a_{01}$ | $a_{02}$ | $q_{03}$ | $b_{04}$ |
| $a_{10}$ | $a_{11}$ | $a_{12}$ | $q_{13}$ | $b_{14}$ |
| $a_{20}$ | $a_{21}$ | $a_{22}$ | $q_{23}$ | $q_{24}$ |

At block 508, the "r−L" data pages of the "(n−1)-th" column are XORed with the first "r−L" pages of the first auxiliary column, q. In the case described herein, r−L=2, and the XORs are $a_{03}+q_{03}$ and $a_{13}+q_{13}$.

An auxiliary column is utilized to compute $a_{03}+q_{03}$ and $a_{13}+q_{13}$, where $a_{03}$ and $a_{13}$ are the data pages shown in the previous arrays.

| $a_{00}$ | $a_{01}$ | $a_{02}$ | $q_{03}$ | $b_{04}$ | $a_{03} + q_{03}$ |
| $a_{10}$ | $a_{11}$ | $a_{12}$ | $q_{13}$ | $b_{14}$ | $a_{13} + q_{13}$ |
| $a_{20}$ | $a_{21}$ | $a_{22}$ | $q_{23}$ | $q_{24}$ | |

At block 510, these "r−L" pages are encoded using an L-erasure correcting code.

Thus, in this embodiment, $c_{23}$ is computed as the XOR of the first two elements of the auxiliary column using a one-erasure correcting vertical code (i.e., single parity).

| $a_{00}$ | $a_{01}$ | $a_{02}$ | $q_{03}$ | $b_{04}$ | $a_{03} + q_{03}$ |
| $a_{10}$ | $a_{11}$ | $a_{12}$ | $q_{13}$ | $b_{14}$ | $a_{13} + q_{13}$ |
| $a_{20}$ | $a_{21}$ | $a_{22}$ | $q_{23}$ | $q_{24}$ | $c_{23}$ |

At block 512, the L parity pages from block 510 are XORed with the last L pages of both columns obtained in block 506. The results of the XOR are written into the last "L" pages of the last two columns of the original array of block 502.

Thus, in the embodiment, the parity of the bottom row is obtained as shown below.

| $a_{00}$ | $a_{01}$ | $a_{02}$ | $a_{03}$ | $p_{04}$ |
|---|---|---|---|---|
| $a_{10}$ | $a_{11}$ | $a_{12}$ | $a_{13}$ | $p_{14}$ |
| $a_{20}$ | $a_{21}$ | $a_{22}$ | $q_{23}+c_{23}=p_{23}$ | $q_{24}+c_{23}=p_{24}$ |

This completes the encoding, and the resulting array is shown below.

| $a_{00}$ | $a_{01}$ | $a_{02}$ | $a_{03}$ | $p_{04}$ |
|---|---|---|---|---|
| $a_{10}$ | $a_{11}$ | $a_{12}$ | $a_{13}$ | $p_{14}$ |
| $a_{20}$ | $a_{21}$ | $a_{22}$ | $p_{23}$ | $p_{24}$ |

The resulting code is similar to RAID 5 in that each row has single parity and RAID 5 may be utilized if at most one entry in each row is erased. The above embodiment illustrated one way of encoding with three rows and five columns. The first two rows carry only one parity page while the third row carries two parity pages, thus the designation 1 (first row one parity), 1 (second row one parity), 2 (third row two parities).

In summary, the array above includes "r" rows (r=3) and "n" columns (n=5) of pages. Each row has "t" parity pages where t>=1. The first row contains one parity page ($t_1$=1), the second row contains one parity page ($t_2$=1), and the third row contains two parity pages ($t_3$=2). This encoding allows up to 2 ($t_3$) erasures to be recovered from any one of the three rows, up to 1 ($t_1$, $t_2$) erasure to be recovered from each of the two remaining rows.

In general, embodiments support having a (1, 1, . . . , 1, 2, 2, . . . 2) scheme, where the number of rows is arbitrary as well as the number of 2s. The encoding of the general case (having L 2s) is similar to the one of the (1,1,2) case except that when the last column in the last row is computed, a vertical L-erasure correcting code is used to obtain the parities. Such a code is independent and may be different from the horizontal codes; its choice depends on the particular application being chosen. An embodiment below shows an embodiment of a (1,1,2,2) code.

Also, as shown in an embodiment below, the construction can be extended to other parameters, such as (1,2,3) which supports one row with one erasure, one row with two erasures, and a third row with three erasures.

Figure 6:
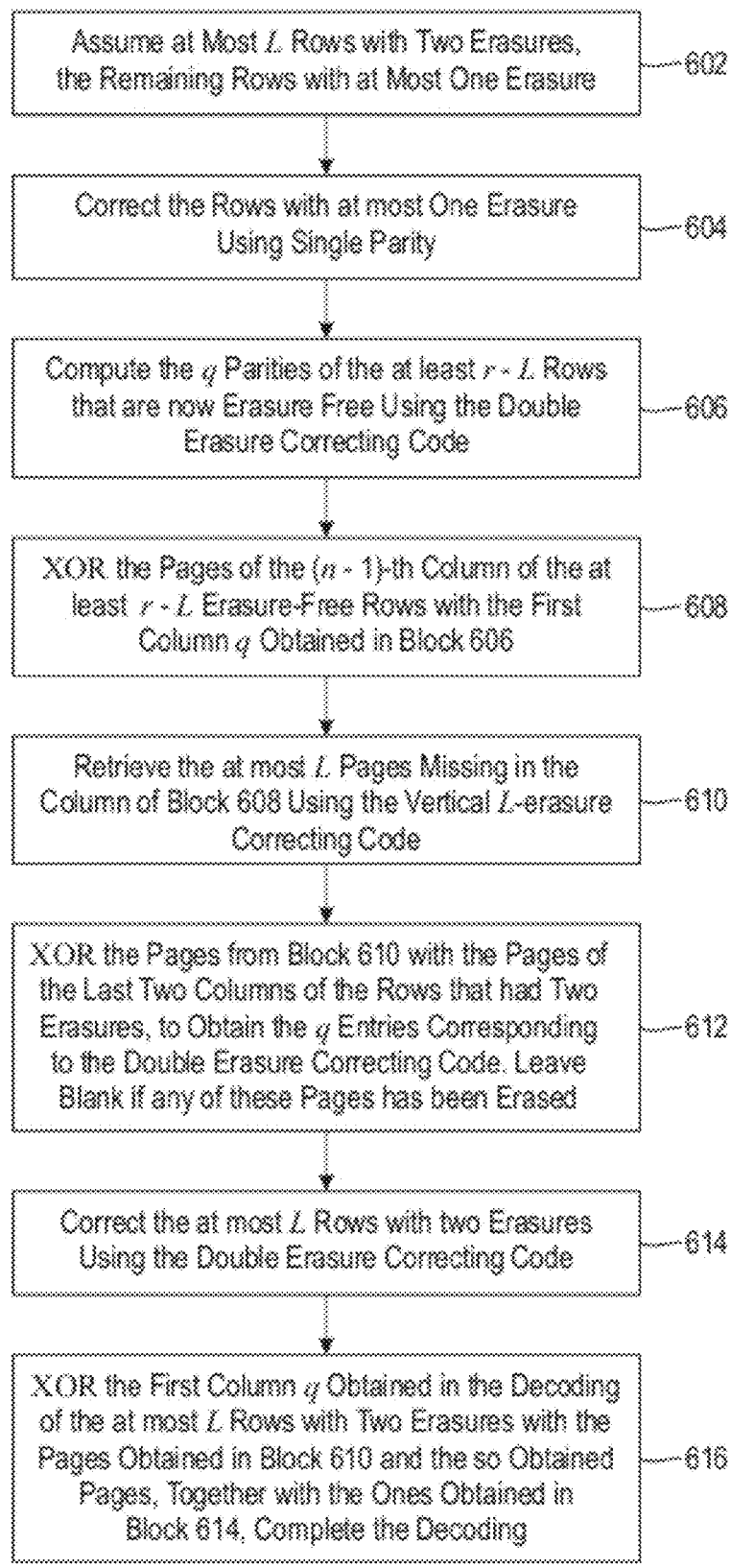
FIG. 6 is a process flow for decoding a read stripe in accordance with an embodiment.

FIG. 6 is a process flow for decoding a write stripe in accordance with an embodiment. In an embodiment, the process depicted in FIG. 6 is performed by the decoder 204. The process flow in FIG. 6 will is described in reference to an (1,1,2) erasure correcting code but may be expanded to cover other erasure correcting codes. At block 602, it is assumed that there are at most "L" rows with two erasures and that the remaining rows contain at most one erasure.

As shown in the array embodiment below, the first and third rows have suffered one erasure (i.e., the data on the page has been lost) while the second row has suffered two erasures. An erasure in the ith row and jth column is denoted by $e_{ij}$.

| $a_{00}$ | $e_{01}$ | $a_{02}$ | $a_{03}$ | $p_{04}$ |
|---|---|---|---|---|
| $e_{10}$ | $a_{11}$ | $a_{12}$ | $e_{13}$ | $p_{14}$ |
| $a_{20}$ | $a_{21}$ | $a_{22}$ | $p_{23}$ | $e_{24}$ |

At block 604, the rows with at most one erasure are corrected using single parity like in RAID 5, i.e., the erased page is recovered by XORing the remaining pages in the corresponding row.

Thus, referring to the example array, the lost data in the first row is recovered by XORing the surviving pages in the first row; and the lost data in the third row is recovered by XORing the surviving pages in the third row. This is possible because $p_{04}$ has the property that it is the XOR of $a_{00}$, $a_{01}$, $a_{02}$, and $a_{03}$; and because $p_{24}$ has the property that it is the XOR of $a_{20}$, $a_{21}$, $a_{22}$, and $a_{23}$. This results in the array below.

| $a_{00}$ | $a_{01}$ | $a_{02}$ | $a_{03}$ | $p_{04}$ |
|---|---|---|---|---|
| $e_{10}$ | $a_{11}$ | $a_{12}$ | $e_{13}$ | $p_{14}$ |
| $a_{20}$ | $a_{21}$ | $a_{22}$ | $p_{23}$ | $p_{24}$ |

At block 606, the q parities of the at least "r–L" rows that are now erasure free are computed using the double erasure correcting code.

Thus, referring to the embodiment, the first parity page of the two-erasure correcting code in the first and third rows are obtained ($q_{03}$ and $q_{23}$).

| $a_{00}$ | $a_{01}$ | $a_{02}$ | $q_{03}$ | $p_{04}$ |
|---|---|---|---|---|
| $e_{10}$ | $a_{11}$ | $a_{12}$ | $e_{13}$ | $p_{14}$ |
| $a_{20}$ | $a_{21}$ | $a_{22}$ | $q_{23}$ | $p_{24}$ |

At block 608, the pages of the "(n−1)-th" column of the at least "r–L" erasure-free rows are XORed with the first column Q obtained at block 606.

Thus, referring to the embodiment, $a_{03}+q_{03}$ and $p_{23}+q_{23}$ are obtained. As described previously, $p_{23}+q_{23}=c_{23}$.

| $a_{00}$ | $a_{01}$ | $a_{02}$ | $a_{03}$ | $p_{04}$ | $a_{03}+q_{03}$ |
|---|---|---|---|---|---|
| $e_{10}$ | $a_{11}$ | $a_{12}$ | $e_{13}$ | $p_{14}$ | |
| $a_{20}$ | $a_{21}$ | $a_{22}$ | $p_{23}$ | $p_{24}$ | $p_{23}+q_{23}=c_{23}$ |

At block 610, the at most L pages missing in the column of block 608 are retrieved using the vertical L-erasure correcting code.

In the embodiment, the second vertical symbol is obtained using the vertical one-erasure correcting code as shown below.

| $a_{00}$ | $a_{01}$ | $a_{02}$ | $a_{03}$ | $p_{04}$ | $a_{03}+q_{03}$ |
|---|---|---|---|---|---|
| $e_{10}$ | $a_{11}$ | $a_{12}$ | $e_{13}$ | $p_{14}$ | $a_{13}+q_{13}$ |
| $a_{20}$ | $a_{21}$ | $a_{22}$ | $p_{23}$ | $p_{24}$ | $r_{23}$ |

At block 612, the pages from block 610 are XORed with the pages of the last two columns of the rows that had two erasures to obtain the q entries corresponding to the double erasure correcting code.

Thus, in the embodiment, $q_{14}$ is obtained as $q_{14}=(a_{13}+q_{13})+p_{14}$.

| $a_{00}$ | $a_{01}$ | $a_{02}$ | $a_{03}$ | $p_{04}$ | | |
|---|---|---|---|---|---|---|
| $e_{10}$ | $a_{11}$ | $a_{12}$ | $e_{13}$ | $p_{14}$ | $a_{13}+q_{13}$ | $q_{14}$ |
| $a_{20}$ | $a_{21}$ | $a_{22}$ | $p_{23}$ | $p_{24}$ | | |

At block 614, the at most L rows with two erasures are corrected using the double erasure correcting code.

In the embodiment, the erased pages in the second row are recovered using the two-erasure correcting code using the row shown below to the right.

| $a_{00}$ | $a_{01}$ | $a_{02}$ | $a_{03}$ | $p_{04}$ | | | | | |
|---|---|---|---|---|---|---|---|---|---|
| $e_{10}$ | $a_{11}$ | $a_{12}$ | $e_{13}$ | $p_{14}$ | $e_{10}$ | $a_{11}$ | $a_{12}$ | $e_{13}$ | $q_{14}$ |
| $a_{20}$ | $a_{21}$ | $a_{22}$ | $p_{23}$ | $p_{24}$ | | | | | |

The result of applying the two-erasure correcting code is shown below.

| $a_{00}$ | $a_{01}$ | $a_{02}$ | $a_{03}$ | $p_{04}$ | | | | | |
|---|---|---|---|---|---|---|---|---|---|
| $e_{10}$ | $a_{11}$ | $a_{12}$ | $e_{13}$ | $p_{14}$ | $a_{10}$ | $a_{11}$ | $a_{12}$ | $q_{13}$ | $q_{14}$ |
| $a_{20}$ | $a_{21}$ | $a_{22}$ | $p_{23}$ | $p_{24}$ | | | | | |

At block 616, the first column q obtained in the decoding of the at least L rows with two erasures with the pages obtained in block 610 is XORed with the pages generated at block 614.

Referring to the embodiment, $a_{13}$ is obtained by XORing $a_{13}+q_{13}$ and $q_{13}$.

| $a_{00}$ | $a_{01}$ | $a_{02}$ | $a_{03}$ | $p_{04}$ | |
|---|---|---|---|---|---|
| $a_{10}$ | $a_{11}$ | $a_{12}$ | $q_{13}$ | $p_{14}$ | $a_{13} = (a_{13} + q_{13}) + q_{13}$ |
| $a_{20}$ | $a_{21}$ | $a_{22}$ | $p_{23}$ | $p_{24}$ | |

The decoding is completed as shown in the array below.

| $a_{00}$ | $a_{01}$ | $a_{02}$ | $a_{03}$ | $p_{04}$ |
|---|---|---|---|---|
| $a_{10}$ | $a_{11}$ | $a_{12}$ | $a_{13}$ | $p_{14}$ |
| $a_{20}$ | $a_{21}$ | $a_{22}$ | $p_{23}$ | $p_{24}$ |

Embodiment of a (1, 1, 2, 2) Encoding Process

In this embodiment, there are five columns (n=5) and four rows (r=4). Data pages are represented as "a", parity pages as "p", unused pages as "b" and temporary pages as "q" or "c". The subscripts next to each page type represent the position of the page in the array (e.g., "$a_{00}$" is a data page at row 0, column 0 in the matrix). The array below shows the locations of the fourteen data pages.

| $a_{00}$ | $a_{01}$ | $a_{02}$ | $a_{03}$ | $b_{04}$ |
|---|---|---|---|---|
| $a_{10}$ | $a_{11}$ | $a_{12}$ | $a_{13}$ | $b_{14}$ |
| $a_{20}$ | $a_{21}$ | $a_{22}$ | $b_{23}$ | $b_{24}$ |
| $a_{30}$ | $a_{31}$ | $a_{32}$ | $b_{33}$ | $b_{34}$ |

The parity of the first two rows is obtained using single parity. In an embodiment, the parity is obtained by XORing the data pages in the first row to obtain $p_{04}$ and by XORing the data pages in the second row to obtain $p_{14}$.

| $a_{00}$ | $a_{01}$ | $a_{02}$ | $a_{03}$ | $p_{04}$ |
|---|---|---|---|---|
| $a_{10}$ | $a_{11}$ | $a_{12}$ | $a_{13}$ | $p_{14}$ |
| $a_{20}$ | $a_{21}$ | $a_{22}$ | $b_{23}$ | $b_{24}$ |
| $a_{30}$ | $a_{31}$ | $a_{32}$ | $b_{33}$ | $b_{34}$ |

Next, the first three (in general, n–2) columns of the array are considered. The last two rows are encoded using a two-erasure correcting code having an overall parity check such that XORing the pages of the row gives the zero page (e.g., a DiRE code to be described below). In the first two rows it is enough to compute the first parity symbol of the aforementioned two-erasure correcting code.

| $a_{00}$ | $a_{01}$ | $a_{02}$ | $q_{03}$ | $b_{04}$ |
|---|---|---|---|---|
| $a_{10}$ | $a_{11}$ | $a_{12}$ | $q_{13}$ | $b_{14}$ |
| $a_{20}$ | $a_{21}$ | $a_{22}$ | $q_{23}$ | $q_{24}$ |
| $a_{30}$ | $a_{31}$ | $a_{32}$ | $q_{33}$ | $q_{34}$ |

An auxiliary column is utilized to compute $a_{03}+q_{03}$ and $a_{13}+q_{13}$, where $a_{03}$ and $a_{13}$ are the data pages shown in the previous arrays.

| $a_{00}$ | $a_{01}$ | $a_{02}$ | $q_{03}$ | $b_{04}$ | $a_{03} + q_{03}$ |
|---|---|---|---|---|---|
| $a_{10}$ | $a_{11}$ | $a_{12}$ | $q_{13}$ | $b_{14}$ | $a_{13} + q_{13}$ |
| $a_{20}$ | $a_{21}$ | $a_{22}$ | $q_{23}$ | $q_{24}$ | |
| $a_{30}$ | $a_{31}$ | $a_{32}$ | $q_{33}$ | $q_{34}$ | |

Next, $c_{23}$ and $c_{33}$ are computed from the first two entries of the auxiliary column using a two-erasure correcting vertical code.

| $a_{00}$ | $a_{01}$ | $a_{02}$ | $q_{03}$ | $b_{04}$ | $a_{03} + q_{03}$ |
|---|---|---|---|---|---|
| $a_{10}$ | $a_{11}$ | $a_{12}$ | $q_{13}$ | $b_{14}$ | $a_{13} + q_{13}$ |
| $a_{20}$ | $a_{21}$ | $a_{22}$ | $q_{23}$ | $q_{24}$ | $c_{23}$ |
| $a_{30}$ | $a_{31}$ | $a_{32}$ | $q_{33}$ | $q_{34}$ | $c_{33}$ |

The parities of the bottom two rows are obtained as shown below.

| $a_{00}$ | $a_{01}$ | $a_{02}$ | $a_{03}$ | $p_{04}$ |
|---|---|---|---|---|
| $a_{10}$ | $a_{11}$ | $a_{12}$ | $a_{13}$ | $p_{14}$ |
| $a_{20}$ | $a_{21}$ | $a_{22}$ | $q_{23} + c_{23} = p_{23}$ | $q_{24} + c_{23} = p_{24}$ |
| $a_{30}$ | $a_{31}$ | $a_{32}$ | $q_{33} + c_{33} = p_{33}$ | $q_{34} + c_{33} = p_{34}$ |

This completes the encoding, and the resulting array is shown below.

| $a_{00}$ | $a_{01}$ | $a_{02}$ | $a_{03}$ | $p_{04}$ |
|---|---|---|---|---|
| $a_{10}$ | $a_{11}$ | $a_{12}$ | $a_{13}$ | $p_{14}$ |
| $a_{20}$ | $a_{21}$ | $a_{22}$ | $p_{23}$ | $p_{24}$ |
| $a_{30}$ | $a_{31}$ | $a_{32}$ | $p_{33}$ | $p_{34}$ |

In summary, the array above includes r rows (r=4) and n columns (n=5) of pages. Each row has t parity pages where t>=1. The first row contains $t_1$ parity pages ($t_1$=1), the second row contains $t_2$ parity pages ($t_2$=1), the third row contains $t_3$ parity pages ($t_3$=2), and the fourth row contains $t_4$ parity pages ($t_4$=2). This encoding allows up to 2 erasures to be recovered from any two of the four rows, and up to 1 erasure to be recovered from the two remaining rows.

Embodiment of a (1, 1, 2, 2) Decoding Process

In this embodiment, there are five columns (n=5) and four rows (r=4). Data pages are represented as "a", parity pages as "p", erased pages as "e", unused pages as "b" and temporary pages as "q" or "c". As shown in the array below, the first and third rows have suffered one erasure (i.e., the data on the page has been lost) while the second and forth rows have suffered two erasures.

| $a_{00}$ | $e_{01}$ | $a_{02}$ | $a_{03}$ | $p_{04}$ |
|---|---|---|---|---|
| $e_{10}$ | $a_{11}$ | $a_{12}$ | $e_{13}$ | $p_{14}$ |
| $a_{20}$ | $a_{21}$ | $a_{22}$ | $p_{23}$ | $e_{24}$ |
| $e_{30}$ | $e_{31}$ | $a_{32}$ | $p_{33}$ | $p_{34}$ |

First, the lost page in the first row is recovered by XORing the surviving pages in the first row; and the lost page in the third row is recovered by XORing the surviving pages in the third row. This results in the array below.

| $a_{00}$ | $a_{01}$ | $a_{02}$ | $a_{03}$ | $p_{04}$ |
|---|---|---|---|---|
| $e_{10}$ | $a_{11}$ | $a_{12}$ | $e_{13}$ | $p_{14}$ |
| $a_{20}$ | $a_{21}$ | $a_{22}$ | $p_{23}$ | $p_{24}$ |
| $e_{30}$ | $e_{31}$ | $a_{32}$ | $p_{33}$ | $p_{34}$ |

Next, the first parity pages of the two-erasure correcting code in the first and third rows are obtained ($q_{03}$ and $q_{23}$).

| $a_{00}$ | $a_{01}$ | $a_{02}$ | $q_{03}$ | $p_{04}$ |
|---|---|---|---|---|
| $e_{10}$ | $a_{11}$ | $a_{12}$ | $e_{13}$ | $p_{14}$ |
| $a_{20}$ | $a_{21}$ | $a_{22}$ | $q_{23}$ | $p_{24}$ |
| $e_{30}$ | $e_{31}$ | $a_{32}$ | $p_{33}$ | $p_{34}$ |

Then, $a_{03}+q_{03}$ and $p_{23}+q_{23}$ are obtained. As described previously, $p_{23}+q_{123}=c_{23}$.

| $a_{00}$ | $a_{01}$ | $a_{02}$ | $a_{03}$ | $p_{04}$ | $a_{03}+q_{03}$ |
|---|---|---|---|---|---|
| $e_{10}$ | $a_{11}$ | $a_{12}$ | $e_{13}$ | $p_{14}$ | |
| $a_{20}$ | $a_{21}$ | $a_{22}$ | $p_{23}$ | $p_{24}$ | $p_{23}+q_{23}=c_{23}$ |
| $e_{30}$ | $e_{31}$ | $a_{32}$ | $p_{33}$ | $p_{34}$ | |

The second and fourth vertical symbols are obtained using the vertical two-erasure correcting code as shown below.

| $a_{00}$ | $a_{01}$ | $a_{02}$ | $a_{03}$ | $p_{04}$ | $a_{03}+q_{03}$ |
|---|---|---|---|---|---|
| $e_{10}$ | $a_{11}$ | $a_{12}$ | $e_{13}$ | $p_{14}$ | $a_{13}+q_{13}$ |
| $a_{20}$ | $a_{21}$ | $a_{22}$ | $p_{23}$ | $p_{24}$ | $c_{23}$ |
| $e_{30}$ | $e_{31}$ | $a_{32}$ | $p_{33}$ | $p_{34}$ | $c_{33}$ |

Next, $q_{14}$ is obtained as $q_{14}=(a_{13}+q_{13})+p_{14}$, and $q_{34}$ is obtained as $q_{34}=c_{33}+p_{34}$.

| $a_{00}$ | $a_{01}$ | $a_{02}$ | $a_{03}$ | $p_{04}$ | | |
|---|---|---|---|---|---|---|
| $e_{10}$ | $a_{11}$ | $a_{12}$ | $e_{13}$ | $p_{14}$ | $a_{13}+q_{13}$ | $q_{14}$ |
| $a_{20}$ | $a_{21}$ | $a_{22}$ | $p_{23}$ | $p_{24}$ | | |
| $e_{30}$ | $e_{31}$ | $a_{32}$ | $p_{33}$ | $p_{34}$ | $c_{33}$ | $q_{34}$ |

The two erased pages in each row are recovered using the two-erasure correcting code using the rows shown below to the right, where $q_{33}$ is obtained as $q_{33}=p_{33}+c_{33}$.

| $a_{00}$ | $a_{01}$ | $a_{02}$ | $a_{03}$ | $p_{04}$ | | | | | |
|---|---|---|---|---|---|---|---|---|---|
| $e_{10}$ | $a_{11}$ | $a_{12}$ | $e_{13}$ | $p_{14}$ | $e_{10}$ | $a_{11}$ | $a_{12}$ | $e_{13}$ | $q_{14}$ |
| $a_{20}$ | $a_{21}$ | $a_{22}$ | $p_{23}$ | $p_{24}$ | | | | | |
| $e_{30}$ | $e_{31}$ | $a_{32}$ | $p_{33}$ | $p_{34}$ | $e_{30}$ | $e_{31}$ | $a_{32}$ | $q_{33}$ | $q_{34}$ |

The result of applying the two-erasure correcting code is shown below.

| $a_{00}$ | $a_{01}$ | $a_{02}$ | $a_{03}$ | $p_{04}$ | | | | | |
|---|---|---|---|---|---|---|---|---|---|
| $e_{10}$ | $a_{11}$ | $a_{12}$ | $e_{13}$ | $p_{14}$ | $a_{10}$ | $a_{11}$ | $a_{12}$ | $q_{13}$ | $q_{14}$ |
| $a_{20}$ | $a_{21}$ | $a_{22}$ | $p_{23}$ | $p_{24}$ | | | | | |
| $e_{30}$ | $e_{31}$ | $a_{32}$ | $p_{33}$ | $p_{34}$ | $a_{30}$ | $a_{31}$ | $a_{32}$ | $q_{33}$ | $q_{34}$ |

Next, $a_{13}$ is obtained by XORing $q_{13}$ with $a_{13}+q_{13}$.

| $a_{00}$ | $a_{01}$ | $a_{02}$ | $a_{03}$ | $p_{04}$ | |
|---|---|---|---|---|---|
| $a_{10}$ | $a_{11}$ | $a_{12}$ | $q_{13}$ | $p_{14}$ | $a_{13}+q_{13}$ |
| $a_{20}$ | $a_{21}$ | $a_{22}$ | $p_{23}$ | $p_{24}$ | |
| $a_{30}$ | $a_{31}$ | $a_{32}$ | $p_{33}$ | $p_{34}$ | |

The decoding is completed as shown in the array below.

| $a_{00}$ | $a_{01}$ | $a_{02}$ | $a_{03}$ | $p_{04}$ |
|---|---|---|---|---|
| $a_{10}$ | $a_{11}$ | $a_{12}$ | $a_{13}$ | $p_{14}$ |
| $a_{20}$ | $a_{21}$ | $a_{22}$ | $p_{23}$ | $p_{24}$ |
| $a_{30}$ | $a_{31}$ | $a_{32}$ | $p_{33}$ | $p_{34}$ |

Embodiment of a (1, 2, 3) Encoding Process

In this embodiment, there are five columns (n=5) and three rows (r=3). Data pages are represented as "a", parity pages as "p", unused pages as "b" and temporary pages as "q" or "c". The subscripts next to each page type represent the position of the page in the array (e.g., "$a_{00}$" is a data page at row 0, column 0 in the matrix). The array below shows the locations of the nine data pages.

| $a_{00}$ | $a_{01}$ | $a_{02}$ | $a_{03}$ | $b_{04}$ |
|---|---|---|---|---|
| $a_{10}$ | $a_{11}$ | $a_{12}$ | $b_{13}$ | $b_{14}$ |
| $a_{20}$ | $a_{21}$ | $b_{22}$ | $b_{23}$ | $b_{24}$ |

First, the first two entries of each row are encoded using a horizontal three-erasure correction code, then $a_{02}$ is XORed with $p_{02}$ and $a_{12}$ is XORed with $p_{12}$. Finally, $q_{22}$ is the parity of a vertical code correcting one erasure with respect to $a_{02}+p_{02}$ and $a_{12}+p_{12}$. This results in the second array below.

| $a_{00}$ | $a_{01}$ | $p_{02}$ | $p_{03}$ | $p_{04}$ |
|---|---|---|---|---|
| $a_{10}$ | $a_{11}$ | $p_{12}$ | $p_{13}$ | $p_{14}$ |
| $a_{20}$ | $a_{21}$ | $p_{22}$ | $p_{23}$ | $p_{24}$ |
| $b_{00}$ | $b_{01}$ | $a_{02}+p_{02}$ | $b_{03}$ | $b_{04}$ |
| $b_{10}$ | $b_{11}$ | $a_{12}+p_{12}$ | $b_{13}$ | $b_{14}$ |
| $b_{20}$ | $b_{21}$ | $q_{22}$ | $b_{23}$ | $b_{24}$ |

Next, the q's shown in each row in the second array below are obtained using a horizontal double erasure correcting code that contains the horizontal three-erasure correction code above. Each row can now correct up to two erasures and each column in the second array can correct one erasure.

| | | | | |
|---|---|---|---|---|
| $a_{00}$ | $a_{01}$ | $p_{02}$ | $p_{03}$ | $p_{04}$ |
| $a_{10}$ | $a_{11}$ | $p_{12}$ | $p_{13}$ | $p_{14}$ |
| $a_{20}$ | $a_{21}$ | $p_{22}$ | $p_{23}$ | $p_{24}$ |
| $b_{00}$ | $b_{01}$ | $a_{02}+p_{02}$ | $q_{03}$ | $q_{04}$ |
| $b_{10}$ | $b_{11}$ | $a_{12}+p_{12}$ | $q_{13}$ | $q_{14}$ |
| $b_{20}$ | $b_{21}$ | $b_{22}$ | $q_{23}$ | $q_{24}$ |

These two arrays above are XORed into the resulting array below where the rows are in a code that can correct two erasures. Each row in the below array can correct up to two erasures due to its linearity, we denote $c_{ij}=p_{ij}+q_{ij}$.

| | | | | |
|---|---|---|---|---|
| $a_{00}$ | $a_{01}$ | $a_{02}$ | $c_{03}$ | $c_{04}$ |
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |

Next, $a_{03}$ is XORed with $r_{03}$ as shown in the second array below.

| | | | | |
|---|---|---|---|---|
| $a_{00}$ | $a_{01}$ | $a_{02}$ | $c_{03}$ | $c_{04}$ |
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |
| $b_{00}$ | $b_{01}$ | $b_{02}$ | $a_{03}+c_{03}$ | $b_{04}$ |
| $b_{10}$ | $b_{11}$ | $b_{12}$ | $b_{13}$ | $b_{14}$ |
| $b_{20}$ | $b_{21}$ | $b_{22}$ | $b_{23}$ | $b_{24}$ |

$a_{03}+c_{03}$ is encoded vertically using a double-erasure correction vertical code, and the labels $s_{13}$ and $s_{23}$ denote the parity pages corresponding to such vertical code.

| | | | | |
|---|---|---|---|---|
| $a_{00}$ | $a_{01}$ | $a_{02}$ | $r_{03}$ | $r_{04}$ |
| $a_{10}$ | $a_{11}$ | $a_{12}$ | $r_{13}$ | $r_{14}$ |
| $a_{20}$ | $a_{21}$ | $r_{22}$ | $r_{23}$ | $r_{24}$ |
| $b_{00}$ | $b_{01}$ | $b_{02}$ | $a_{03}+r_{03}$ | $b_{04}$ |
| $b_{10}$ | $b_{11}$ | $b_{12}$ | $s_{13}$ | $b_{14}$ |
| $b_{20}$ | $b_{21}$ | $b_{22}$ | $s_{23}$ | $b_{24}$ |

Each row in the second array is then encoded using a one-erasure correcting code that contains the two-erasure correcting code in the first array. Thus, each column in the second array can correct two erasures and each row can correct one erasure.

| | | | | |
|---|---|---|---|---|
| $a_{00}$ | $a_{01}$ | $a_{02}$ | $c_{03}$ | $c_{04}$ |
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |
| $b_{00}$ | $b_{01}$ | $b_{02}$ | $a_{03}+c_{03}$ | $s_{04}$ |
| $b_{10}$ | $b_{11}$ | $b_{12}$ | $s_{13}$ | $s_{14}$ |
| $b_{20}$ | $b_{21}$ | $b_{22}$ | $s_{23}$ | $s_{24}$ |

The arrays are then XORed. The rows of the result are encoded into a one-erasure correction code as shown in the below array, where $t_{ij}=c_{ij}+s_{ij}$. In this array each row can correct one erasure due to linearity. This completes the encoding.

| | | | | |
|---|---|---|---|---|
| $a_{00}$ | $a_{01}$ | $a_{02}$ | $a_{03}$ | $t_{04}$ |
| $a_{10}$ | $a_{11}$ | $a_{12}$ | $t_{13}$ | $t_{14}$ |
| $a_{20}$ | $a_{21}$ | $c_{22}$ | $t_{23}$ | $t_{24}$ |

Embodiment of a (1, 2, 3) Decoding Process

In this embodiment, there are three erasures in the first row, one in the second row, and two in the third row.

| | | | | |
|---|---|---|---|---|
| $e_{00}$ | $e_{01}$ | $a_{02}$ | $e_{03}$ | $t_{04}$ |
| $a_{10}$ | $a_{11}$ | $a_{12}$ | $t_{13}$ | $e_{14}$ |
| $a_{20}$ | $e_{21}$ | $c_{22}$ | $e_{23}$ | $t_{24}$ |

First, the row with only one erasure (i.e., the second row), is corrected using single parity.

| | | | | |
|---|---|---|---|---|
| $e_{00}$ | $e_{01}$ | $a_{02}$ | $e_{03}$ | $t_{04}$ |
| $a_{10}$ | $a_{11}$ | $a_{12}$ | $t_{13}$ | $t_{14}$ |
| $a_{20}$ | $e_{21}$ | $c_{22}$ | $e_{23}$ | $t_{24}$ |

Next, the first three entries in the second row are encoded with a two erasure correcting code.

| | | | | |
|---|---|---|---|---|
| $e_{00}$ | $e_{01}$ | $a_{02}$ | $e_{03}$ | $t_{04}$ |
| $a_{10}$ | $a_{11}$ | $a_{12}$ | $t_{13}$ | $t_{14}$ |
| $a_{20}$ | $e_{21}$ | $c_{22}$ | $e_{23}$ | $t_{24}$ |
| $b_{00}$ | $b_{01}$ | $b_{02}$ | $b_{03}$ | $b_{04}$ |
| $a_{10}$ | $a_{11}$ | $a_{12}$ | $c_{13}$ | $c_{14}$ |
| $b_{20}$ | $b_{21}$ | $b_{22}$ | $b_{23}$ | $b_{24}$ |

Both the middle rows in the arrays are XORed. Thus, $t_{ij}+c_{ij}=s_{ij}$, where $s_{ij}$ is part of the vertical two-erasure correcting code shown above in the encoding. The last two columns are retrieved using such two-erasure correcting code as shown in the second array below:

| | | | | |
|---|---|---|---|---|
| $e_{00}$ | $e_{01}$ | $a_{02}$ | $e_{03}$ | $t_{04}$ |
| $a_{10}$ | $a_{11}$ | $a_{12}$ | $t_{13}$ | $t_{14}$ |
| $a_{20}$ | $e_{21}$ | $c_{22}$ | $e_{23}$ | $t_{24}$ |
| $b_{00}$ | $b_{01}$ | $b_{02}$ | $a_{03}+c_{03}$ | $s_{04}$ |
| 0 | 0 | 0 | $s_{13}$ | $s_{14}$ |
| $b_{20}$ | $b_{21}$ | $b_{22}$ | $s_{23}$ | $s_{24}$ |

The arrays are then XORed, resulting in the below array.

| | | | | |
|---|---|---|---|---|
| $e_{00}$ | $e_{01}$ | $a_{02}$ | $e_{03}$ | $c_{04}$ |
| $a_{10}$ | $a_{11}$ | $a_{12}$ | $c_{13}$ | $c_{14}$ |
| $a_{20}$ | $e_{21}$ | $c_{22}$ | $e_{23}$ | $c_{24}$ |

Now, all the rows can correct two erasures. Therefore, the last row can be corrected, resulting in the array shown below.

| | | | | |
|---|---|---|---|---|
| $e_{00}$ | $e_{01}$ | $a_{02}$ | $e_{03}$ | $c_{04}$ |
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |

The first two entries in the last two rows of the array are encoded with three parities as shown in the bottom array below.

| $e_{00}$ | $e_{01}$ | $a_{02}$ | $e_{03}$ | $c_{04}$ |
|---|---|---|---|---|
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |
| $b_{00}$ | $b_{01}$ | $b_{02}$ | $b_{03}$ | $b_{04}$ |
| $a_{10}$ | $a_{11}$ | $p_{12}$ | $p_{13}$ | $p_{14}$ |
| $a_{20}$ | $a_{21}$ | $p_{22}$ | $p_{23}$ | $p_{24}$ |

The last two rows of both arrays are XORed resulting in the following array below at the bottom and $q_{ij}=c_{ij}+p_{ij}$:

| $e_{00}$ | $e_{01}$ | $a_{02}$ | $e_{03}$ | $c_{04}$ |
|---|---|---|---|---|
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |
| $b_{00}$ | $b_{01}$ | $b_{02}$ | $b_{03}$ | $b_{04}$ |
| 0 | 0 | $a_{12}+p_{12}$ | $q_{13}$ | $q_{14}$ |
| 0 | 0 | $q_{22}$ | $q_{23}$ | $q_{24}$ |

Each column can correct one erasure and the top three entries in the second array are retrieved using the vertical code, resulting in the following array below:

| $e_{00}$ | $e_{01}$ | $a_{02}$ | $e_{03}$ | $c_{04}$ |
|---|---|---|---|---|
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |
| $b_{00}$ | $b_{01}$ | $a_{02}+p_{02}$ | $q_{03}$ | $q_{04}$ |
| 0 | 0 | $a_{12}+p_{12}$ | $q_{13}$ | $q_{14}$ |
| 0 | 0 | $q_{22}$ | $q_{23}$ | $q_{24}$ |

The arrays are XORed resulting in the following array, each row of which is now in a three-erasure correcting code.

| $e_{00}$ | $e_{01}$ | $p_{02}$ | $e_{03}$ | $p_{04}$ |
|---|---|---|---|---|
| $a_{10}$ | $a_{11}$ | $p_{12}$ | $p_{13}$ | $p_{14}$ |
| $a_{20}$ | $a_{21}$ | $p_{22}$ | $p_{23}$ | $p_{24}$ |

The three erasures in the first row are then corrected, resulting in the following array.

| $a_{00}$ | $a_{01}$ | $p_{02}$ | $p_{03}$ | $p_{04}$ |
|---|---|---|---|---|
| $a_{10}$ | $a_{11}$ | $p_{12}$ | $p_{13}$ | $p_{14}$ |
| $a_{20}$ | $a_{21}$ | $p_{22}$ | $p_{23}$ | $p_{24}$ |

Next, all the symbols are recovered. The first step is to XOR the array with the array above. Both arrays are shown below.

| $a_{00}$ | $a_{01}$ | $p_{02}$ | $p_{03}$ | $p_{04}$ |
|---|---|---|---|---|
| $a_{10}$ | $a_{11}$ | $p_{12}$ | $p_{13}$ | $p_{14}$ |
| $a_{20}$ | $a_{21}$ | $p_{22}$ | $p_{23}$ | $p_{24}$ |
| 0 | 0 | $a_{02}+p_{02}$ | $q_{03}$ | $q_{04}$ |
| 0 | 0 | $a_{12}+p_{12}$ | $q_{13}$ | $q_{14}$ |
| 0 | 0 | $q_{22}$ | $q_{23}$ | $q_{24}$ |

This results in the first array below, which is then XORed with the bottom array which comes from array above.

| $a_{00}$ | $a_{01}$ | $a_{02}$ | $c_{03}$ | $c_{04}$ |
|---|---|---|---|---|
| $a_{10}$ | $a_{11}$ | $a_{12}$ | $c_{13}$ | $c_{14}$ |
| $a_{20}$ | $a_{21}$ | $c_{22}$ | $c_{23}$ | $c_{24}$ |

-continued

| 0 | 0 | 0 | $a_{03}+c_{03}$ | $s_{04}$ |
|---|---|---|---|---|
| 0 | 0 | 0 | $s_{13}$ | $s_{14}$ |
| 0 | 0 | 0 | $s_{23}$ | $s_{24}$ |

This completes the decoding as shown in the below array.

| $a_{00}$ | $a_{01}$ | $a_{02}$ | $a_{03}$ | $t_{04}$ |
|---|---|---|---|---|
| $a_{10}$ | $a_{11}$ | $a_{12}$ | $t_{13}$ | $t_{14}$ |
| $a_{20}$ | $a_{21}$ | $c_{22}$ | $t_{23}$ | $t_{24}$ |

Another way to obtain similar results to the scheme described above is to use a RS code with the same amount of redundancy. For instance, in the embodiment of the (1, 1, 2) scheme described above, the total amount of redundancy is 4 pages. It is possible to implement a Reed-Solomon (RS) code with 4 redundant pages that can correct any 4 erased pages in the array. From that point of view, the RS code is more powerful than embodiments of the code described herein. However, the complexity of a RS code is much greater than embodiments of the scheme described herein, in particular when there are a relatively large number of rows in the scheme, like 16 or 32 rows in typical embodiments. In normal operation, the schemes described herein operate very similarly to RAID 5, recovering from one erasure in each row. Only when there is the rare event of two erasures in a row is the whole power of the codes described herein invoked. RS on the other hand, needs to use the whole length of the code for each failure. For that reason, its implementation is less practical and the encoding and decoding processes are much more complex.

Technical effects and benefits include the ability to provide the same protection as a redundant array of independent disks RAID 6, but with storage efficiency approaching that of RAID 5. Thus, an embodiment may be utilized to maximize the protection against stripe failures for a given amount of redundancy.

Embodiment of Encoding a Diagonal-Row Encoding (DiRE) Code that Corrects 2 Erasures and Has an Overall Parity-Check.

The schemes described herein, such as the (1,1,2) scheme, include a system of nested codes, with the largest code being a parity-check code. Thus, the codes described herein have an overall parity-check and more generally, a nesting property. In particular, the XOR of all the elements of any codeword is zero. Well known array codes, such as EVENODD or RDP do not have an overall parity-check symbol. RDP is nested, but the larger code (based on diagonal parity) is not MDS, so cannot be used in the codes described herein.

The embodiment code described below includes arrays of $(z-1)$ rows and at most $(z+1)$ columns, where z is a prime number. In the following embodiment, where $z=5$, the array contains 4 rows and 6 columns, with locations specified as below. In an embodiment, $L_{00}$, $L_{01}$, $L_{02}$, $L_{03}$, $L_{04}$, $L_{05}$ are segments from 6 different pages located on 6 different storage devices. As shown in the embodiment $L_{00}$, $L_{10}$, $L_{20}$, $L_{30}$ are segments from the same page. Thus, the array below represents one page from each of 6 storage devices, with each page divided up into four segments. The last row ($L_{4x}$) is an imaginary row and used for calculation purposes only.

| $L_{00}$ | $L_{01}$ | $L_{02}$ | $L_{03}$ | $L_{04}$ | $L_{05}$ |
| --- | --- | --- | --- | --- | --- |
| $L_{10}$ | $L_{11}$ | $L_{12}$ | $L_{13}$ | $L_{14}$ | $L_{15}$ |
| $L_{20}$ | $L_{21}$ | $L_{22}$ | $L_{23}$ | $L_{24}$ | $L_{25}$ |
| $L_{30}$ | $L_{31}$ | $L_{32}$ | $L_{33}$ | $L_{34}$ | $L_{35}$ |
| $L_{40}$ | $L_{41}$ | $L_{42}$ | $L_{43}$ | $L_{44}$ | $L_{45}$ |

Assume the following content of the array, where the value "b" indicates that the location currently does not have a value.

| 1 | 1 | 0 | 1 | b | b |
| --- | --- | --- | --- | --- | --- |
| 1 | 0 | 0 | 1 | b | b |
| 0 | 1 | 1 | 0 | b | b |
| 1 | 1 | 1 | 1 | b | b |
| 0 | 0 | 0 | 0 | b | b |

First the parity of each diagonal is computed resulting in the values in the below array. $L_{04}$ is equal to "1" which is the parity of the diagonal formed by $L_{40}, L_{31}, L_{22},$ and $L_{13}$. $L_{14}$ is equal to "0" which is the parity of the diagonal formed by $L_{41}, L_{32}, L_{23},$ and $L_{00}$. $L_{24}$ is equal to "1" which is the parity of the diagonal formed by $L_{42}, L_{33}, L_{10},$ and $L_{01}$. $L_{34}$ is equal to "0" which is the parity of the diagonal formed by $L_{43}, L_{20}, L_{11},$ and $L_{02}$. $L_{44}$ is equal to "1" which is the parity of the diagonal formed by $L_{30}, L_{21}, L_{12},$ and $L_{03}$.

| 1 | 1 | 0 | 1 | 1 | b |
| --- | --- | --- | --- | --- | --- |
| 1 | 0 | 0 | 1 | 0 | b |
| 0 | 1 | 1 | 0 | 1 | b |
| 1 | 1 | 1 | 1 | 0 | b |
| 0 | 0 | 0 | 0 | 1 | b |

Next each element in the parity column (column 4) is XORed with the stored bit in the last position of column 4, i.e., $L_{44=1}$. By XORing each element in column 4 with a "1", the array below in which each diagonal has odd parity is obtained.

| 1 | 1 | 0 | 1 | 0 | b |
| --- | --- | --- | --- | --- | --- |
| 1 | 0 | 0 | 1 | 1 | b |
| 0 | 1 | 1 | 0 | 0 | b |
| 1 | 1 | 1 | 1 | 1 | b |
| 0 | 0 | 0 | 0 | 0 | b |

Next, the encoding is completed as shown in the below array by finding the parity of the rows (always even in this embodiment).

| 1 | 1 | 0 | 1 | 0 | 1 |
| --- | --- | --- | --- | --- | --- |
| 1 | 0 | 0 | 1 | 1 | 1 |
| 0 | 1 | 1 | 0 | 0 | 0 |
| 1 | 1 | 1 | 1 | 1 | 1 |
| 0 | 0 | 0 | 0 | 0 | 0 |

Embodiment of a Parity-Check Matrix of a 2 Erasure DiRE Code

As taught in BR93, consider the ring generated by $f(x)=1+x+x^2+\ldots+x^{z-1}$, where z is a prime number, and let $\alpha$ be a rotation modulo $f(x)$. Then a parity-check matrix for the DiRE code is given by:

$$H = \begin{matrix} 1 & \alpha & \alpha^2 & \ldots & \alpha^{z-1} & 0 \\ 1 & 1 & 1 & \ldots & 1 & 1 \end{matrix}$$

The code defined by the parity-check matrix, H, in the ring generated by f(x) is equivalent to the description given in the embodiment above where z=5.

Decoding of 2 Erasures: First Case, Last Column Erased

This case is analogous to the encoding and the embodiment starts with the filling in the missing imaginary entry.

| 1 | 1 | b | 1 | 0 | b |
| --- | --- | --- | --- | --- | --- |
| 1 | 0 | b | 1 | 1 | b |
| 0 | 1 | b | 0 | 0 | b |
| 1 | 1 | b | 1 | 1 | b |

The result is the following array.

| 1 | 1 | b | 1 | 0 | b |
| --- | --- | --- | --- | --- | --- |
| 1 | 0 | b | 1 | 1 | b |
| 0 | 1 | b | 0 | 0 | b |
| 1 | 1 | b | 1 | 1 | b |
| 0 | 0 | 1 | 0 | 0 | b |

Next, the decoding of the third column is performed using the reverse of the diagonal parity encoding. This results in the following array.

| 1 | 1 | 1 | 1 | 0 | b |
| --- | --- | --- | --- | --- | --- |
| 1 | 0 | 1 | 1 | 1 | b |
| 0 | 1 | 0 | 0 | 0 | b |
| 1 | 1 | 0 | 1 | 1 | b |
| 0 | 0 | 1 | 0 | 0 | b |

The entries in the recovered column (third column) are XORed with the last entry in such third column as shown below.

| 1 | 1 | 1+1 | 1 | 0 | b |
| --- | --- | --- | --- | --- | --- |
| 1 | 0 | 1+1 | 1 | 1 | b |
| 0 | 1 | 0+1 | 0 | 0 | b |
| 1 | 1 | 0+1 | 1 | 1 | b |
| 0 | 0 | 1+1 | 0 | 0 | b |

This results in the following array.

| 1 | 1 | 0 | 1 | 0 | b |
| --- | --- | --- | --- | --- | --- |
| 1 | 0 | 0 | 1 | 1 | b |
| 0 | 1 | 1 | 0 | 0 | b |
| 1 | 1 | 1 | 1 | 1 | b |
| 0 | 0 | 0 | 0 | 0 | b |

The decoding is completed by computing the horizontal parity as shown in the array below.

| 1 | 1 | 0 | 1 | 0 | 1 |
| --- | --- | --- | --- | --- | --- |
| 1 | 0 | 0 | 1 | 1 | 1 |

-continued

| | | | | | |
|---|---|---|---|---|---|
| 0 | 1 | 1 | 0 | 0 | 0 |
| 1 | 1 | 1 | 1 | 1 | 1 |
| 0 | 0 | 0 | 0 | 0 | 0 |

The decoded values, without the imaginary row are shown in the array below.

| | | | | | |
|---|---|---|---|---|---|
| 1 | 1 | 0 | 1 | 0 | 1 |
| 1 | 0 | 0 | 1 | 1 | 1 |
| 0 | 1 | 1 | 0 | 0 | 0 |
| 1 | 1 | 1 | 1 | 1 | 1 |

Decoding of 2 Erasures: Second Case, Two Erasures in First z Columns

The embodiment starts by filling up with 0s the missing imaginary entries.

| | | | | | |
|---|---|---|---|---|---|
| 1 | b | 0 | b | 0 | 1 |
| 1 | b | 0 | b | 1 | 1 |
| 0 | b | 1 | b | 0 | 0 |
| 1 | b | 1 | b | 1 | 1 |

This results in the following array.

| | | | | | |
|---|---|---|---|---|---|
| 1 | b | 0 | b | 0 | 1 |
| 1 | b | 0 | b | 1 | 1 |
| 0 | b | 1 | b | 0 | 0 |
| 1 | b | 1 | b | 1 | 1 |
| 0 | b | 0 | b | 0 | 0 |

Next, the parity of the last column is computed, i.e., if the number of is in the last column is odd, the parity is 1, while if such number is even, the parity is 0. In this case, the last column contains three ones, thus, the parity of the last column in 1. This parity value 1 is written in the last row of the array as shown below.

| | | | | | |
|---|---|---|---|---|---|
| 1 | b | 0 | b | 0 | 1 |
| 1 | b | 0 | b | 1 | 1 |
| 0 | b | 1 | b | 0 | 0 |
| 1 | b | 1 | b | 1 | 1 |
| 1 | 1 | 1 | 1 | 1 | 1 |

Next, the decoding of the third column is performed using the reverse of the diagonal parity encoding. The recursion is started in the diagonal through the last entry of one of the erased columns and is continued horizontally. This results in the following array.

| | | | | | |
|---|---|---|---|---|---|
| 1 | 1 | 0 | 1 | 0 | 1 |
| 1 | 0 | 0 | 1 | 1 | 1 |
| 0 | 1 | 1 | 0 | 0 | 0 |
| 1 | 1 | 1 | 1 | 1 | 1 |
| 1 | 1 | 1 | 1 | 1 | 1 |

The decoded values, without the imaginary row are shown in the array below.

| | | | | | |
|---|---|---|---|---|---|
| 1 | 1 | 0 | 1 | 0 | 1 |
| 1 | 0 | 0 | 1 | 1 | 1 |
| 0 | 1 | 1 | 0 | 0 | 0 |
| 1 | 1 | 1 | 1 | 1 | 1 |

Embodiment of Encoding a DiRE Code Correcting 3 Erasures, for z=5.

When z=5, the array contains 4 rows and 6 columns, and locations are specified as below. The last row ($L_{4x}$) is an imaginary row and used for calculation purposes only.

| | | | | | |
|---|---|---|---|---|---|
| $L_{00}$ | $L_{01}$ | $L_{02}$ | $L_{03}$ | $L_{04}$ | $L_{05}$ |
| $L_{10}$ | $L_{11}$ | $L_{12}$ | $L_{13}$ | $L_{14}$ | $L_{15}$ |
| $L_{20}$ | $L_{21}$ | $L_{22}$ | $L_{23}$ | $L_{24}$ | $L_{25}$ |
| $L_{30}$ | $L_{31}$ | $L_{32}$ | $L_{33}$ | $L_{34}$ | $L_{35}$ |
| $L_{40}$ | $L_{41}$ | $L_{42}$ | $L_{43}$ | $L_{44}$ | $L_{45}$ |

Assume the following content of the array, where the value "b" indicates that the location currently does not have a value.

| | | | | | |
|---|---|---|---|---|---|
| 1 | 1 | 0 | b | b | b |
| 1 | 0 | 0 | b | b | b |
| 0 | 1 | 1 | b | b | b |
| 1 | 1 | 1 | b | b | b |
| 0 | 0 | 0 | b | b | b |

In this embodiment, lines of slope 2 are used to obtain the fourth column. First the parity of each of these lines of slope 2 is computed resulting in the values in the below array. $L_{03}$ is equal to "0" which is the parity of the line formed by $L_{10}$, $L_{41}$ and $L_{22}$. $L_{13}$ is equal to "0" which is the parity of the line formed by $L_{20}$, $L_{11}$, and $L_{32}$. $L_{23}$ is equal to "1" which is the parity of the line formed by $L_{30}$, $L_{11}$, and $L_{42}$. $L_{33}$ is equal to "1" which is the parity of the line formed by $L_{40}$, $L_{21}$, and $L_{02}$. $L_{43}$ is equal to "0" which is the parity of the line formed by $L_{00}$, $L_{31}$, and $L_{12}$. The resulting array is shown below:

| | | | | | |
|---|---|---|---|---|---|
| 1 | 1 | 0 | 0 | b | b |
| 1 | 0 | 0 | 0 | b | b |
| 0 | 1 | 1 | 1 | b | b |
| 1 | 1 | 1 | 1 | b | b |
| 0 | 0 | 0 | 0 | b | b |

Next, each element in the fourth column is XORed with the stored bit in the last position of such column. Since such bit is 0, the column remains unchanged. The below array reflects the completed encoding with lines of slope 2. In this embodiment, each line of slope 2 has even parity.

| | | | | | |
|---|---|---|---|---|---|
| 1 | 1 | 0 | 0 | b | b |
| 1 | 0 | 0 | 0 | b | b |
| 0 | 1 | 1 | 1 | b | b |
| 1 | 1 | 1 | 1 | b | b |
| 0 | 0 | 0 | 0 | b | b |

This completes the encoding of the lines of slope 2. The last two columns are obtained like in the previous embodiment described above; this highlights the nested nature of the codes. The decoded values, without the imaginary row are shown in the array below.

| 1 | 1 | 0 | 0 | 0 | 0 |
| 1 | 0 | 0 | 0 | 1 | 0 |
| 0 | 1 | 1 | 1 | 1 | 0 |
| 1 | 1 | 1 | 1 | 0 | 0 |

In order to decode three erasures, the recursive method developed in BR93 may be utilized. For more than three erasures, the nested expression of the parity-check matrix is extended. However, in the case of more than three erasures, the codes are not necessarily MDS for every prime number, z. Some prime numbers give codes that are MDS with four parities (i.e., they can correct four erasures) but some don't. However, in most applications three parities are enough. Finally, the nested construction may be effected with an $\alpha$ that is a root in a Galois field $GF(2^b)$. In this case, the construction is very similar to the one of RS codes over a finite field. The encoding and decoding are similar to the case of regular RS codes, and those versed in the art should easily be able to apply the RS procedures in the nested case.

When z=5, the DiRE code has a length up to 6. Each page can be divided into 1 kilobyte (K) segments, and each 1K segment dictates the granularity of the code. However, 6 devices may be too few for some applications, and a longer code may need to be utilized. Since a typical page size is 4K, it is convenient that the granularity is a power of 2, so a power of 2 that added to 1 gives a prime number is determined. One such power is 16 corresponding to the prime number z=17. In this case a DiRE code of length up to 18 is utilized and the granularity is then given by 256 byte (B) blocks.

Embodiment of a Parity-Check Matrix of a 3 Erasure DiRE Code

A parity check matrix for a DiRE code correcting 3 erasures is given by:

$$H = \begin{matrix} 1 & \alpha^2 & \alpha^4 & \ldots & \alpha^{2(z-2)} & 0 & 0 \\ 1 & \alpha & \alpha^2 & \ldots & \alpha^{z-2} & \alpha^{z-1} & 0 \\ 1 & 1 & 1 & \ldots & 1 & 1 & 1 \end{matrix}$$

Comparing this matrix to the above embodiment of a parity-check matrix of a 2 erasure code, the nested structure of the DiRE code can be seen. In effect, the last two rows of its parity-check matrix correspond to the parity-check matrix of the code correcting two erasures, so the 3-erasure correcting code is nested in the 2-erasure correcting code. Similarly, the DiRE code correcting two erasures is nested in the single-parity code.

Embodiment of Encoding Equations

An embodiment applies to an array having dimensions of $(z-1)$ rows by up to $(z+1)$ columns, where z is a prime number. The code in this embodiment encodes the first $z-1$ columns into the last two columns and has the following characteristics: 1. the code is MDS, i.e., it can recover any two erased columns; 2. the code has a global parity-check, i.e., the XOR of any encoded row is 0; 3. given properties 1 and 2, it minimizes the number of XORs at the encoding; and 4. the decoding and encoding are straightforward (the encoding is a special case of the decoding).

Denote by $a_{i,j}$, $0 \leq i$, $j \leq z-2$, the information pages; and by $p_i$ and $q_i$, $0 \leq i$, $j \leq z-2$, the two parity columns. The following convention is used in describing how to obtain the parity columns: $<m>_z = n$ means that $m \equiv n \pmod{z}$ and $0 \leq n < z$ (for example, $<8>_5 = 3$). Let S=the XOR of the $a_{z-2-j,j}$s from j=0 to z-2.

Then, for $0 \leq i \leq z-2$, $p_i$=S XORed with the XOR of the $a_{<i-j-1>_z,j}$ s from j=0 to z-2 and j≠i, and $q_i$=$p_i$ XORed with the XOR of the $a_{i,j}$s from j=0 to z-2.

It is noted that the q column is an overall parity column.

Thus, as described above, the above calculations are used to implement an MDS code that allows recovery from up to two erasures. The MDS code divides each page into z-1 segments (z is a prime number) and the length of the code is at most z+1. A first parity page, p, is computed as: (the first data page) XOR (the second data page multiplied by $\alpha$) XOR (the third data page multiplied by $\alpha^2$) XOR . . . (the n-2 data page multiplied by $\alpha^{n-3}$). In this embodiment $\alpha$ is a root of the polynomial described above of degree z-1. A second parity page, q, is computed as: p XOR (the first data page) XOR (the second data page) XOR (the third data page) XOR . . . (the n-2 data page).

The code can be extended to multiple erasures. For three erasures, it continues to be MDS. In other cases, it depends on the prime number chosen. For instance, if the code can correct 3 erasures, the information is given by the first z-2 columns, $a_{i,j}$, $0 \leq i \leq z-2$, $0 \leq j \leq z-3$, and let $r_i$, $0 \leq i \leq z-2$, denote the pages in parity column z-2. Then the $r_i$s are obtained as follows. Let $S_2$=the XOR of the $a_{<-5-2j>_z,j}$s, from j=0 to z-3.

Then, for $0 \leq i \leq z-2$, $c_i = S_2$ XORed with the XOR of the $a_{<i-4-2j>_z,j}$ s from j=0 to z-3 and i≠$<2j+3>_z$.

The next two columns, the p and the q columns, are obtained as before once the c column is obtained.

Thus, as described above, the above calculations are used to implement an MDS code that allows recovery from up to three erasures. The MDS code divides each page into z-1 segments (z is a prime number) and the length of the code is at most z+1. A first parity page, c, is computed as: (the first data page) XOR (the second data page multiplied by $\alpha^2$) XOR (the third data page multiplied by $\alpha^4$) XOR . . . (the n-3 data page multiplied by $\alpha^{2(n-4)}$). In this embodiment $\alpha$ is a root of the polynomial described above of degree z-1. A second parity page, p, is computed as: (the first data page) XOR (the second data page multiplied by $\alpha$) XOR (the third data page multiplied by $\alpha^2$) XOR . . . (the n-3 data page multiplied by $\alpha^{n-4}$) XOR (the first parity page c multiplied by $\alpha^{n-3}$). A third parity page, q, is computed as: (the first data page) XOR (the second data page) XOR . . . (the n-3 data page) XOR (the first parity page c) XOR (the second parity page p).

Embodiment of the Decoding Equations

This embodiment handles two erasures, but it may be extended to more than two erasures. In this embodiment the erasures have occurred in columns i and j, where $0 \leq i \leq j \leq z$. For $0 \leq t \leq z-2$, let $a_{t,z-1} = p_t$ and $a_{t,z} = q_t$. Two cases are distinguished: j=z and j<z. Consider the first case j=z. Let S=the XOR of $a_{<i-1-j>_z,j}$, for j=0 to z-2 and j≠i Then, for $0 \leq t \leq z-2$, $a_{t,i}$=S XORed with the XOR of $a_{<t+i-j>_z,j}$, for j=0 to z-2, j≠i and j≠$<t+i+1>_z$, and $a_{t,z} = q_t$=the XOR of the $a_{t,j}$s from j=0 to z-1.

Next, the case of j<z is considered. Let

S=the XOR of the $a_{t,z}$s from t=0 to z-2.

Let $a_{z-1,m} = 0$ for $0 \leq m \leq z$. Then, for $0 \leq L \leq z-2$, compute $a_{<-(j-i)(L+1)-1>_z,i}$=S XORed with the XOR of the $a_{<-(j-1)(L+1)+j-t>_z,t}$s, from t=0 to z-1 and t≠j and $a_{<-(j-i)(L+1)-1>_z,i}$=the XOR of the $a_{<-(j-1)(L+1)-1>_z,i}$s, from t=0 to z and t≠i.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for storing data in a storage array, the system comprising:
   a storage array comprising a plurality of storage devices; and
   an array controller configured for:
   receiving write data;
   arranging the write data in r rows and n columns of pages;
   encoding the write data using a plurality of horizontal and vertical erasure correcting codes on the pages such that a first row contains $t_1$ parity pages with $t_1 \geq 1$, a second row contains $t_2$ parity pages with $t_2 \geq t_1$, a third row contains $t_3$ parity pages with $t_3 \geq t_2$, and so on, up to an rth row which contains $t_r$ parity pages with $t_r \geq t_{r-1}$ and $n > t_r > t_1$ wherein the encoding allows recovery from up to $t_r$ erasures in any one of the r rows, up to $t_{r-1}$ erasures in any one of the remaining r−1 rows, up to $t_{r-2}$ erasures in any one of the remaining r−2 rows, and so on, such that the encoding allows recovery from up to $t_1$ erasures in the last remaining row, and output from the encoding includes encoded write data; and
   writing the encoded write data as a write stripe across n storage devices in a storage array.

2. The system of claim 1, wherein at least one of the horizontal and vertical erasure correcting codes is a maximum distance separable (MDS) code.

3. The system of claim 2, wherein the MDS code allows recovery from up to two erasures, the MDS code dividing each page into z−1 segments, z is a prime number, and the length n of the code is at most z+1, wherein
   a first parity page is computed as an exclusive or (XOR) of a first data page, a second data page multiplied by $\alpha$, a third data page multiplied by $\alpha^2$, a fourth data page multiplied by $\alpha^3$, and so on, up to data page n−2 multiplied by $\alpha^{n-3}$, where $\alpha$ is a root of a polynomial of degree z−1; and
   a second parity page is computed as an XOR of the first n−2 data pages with the first parity page.

4. The system of claim 2, wherein the MDS code allows recovery from up to three erasures, the MDS code dividing each page into z−1 segments, z is a prime number, and the length n of the code is at most z+1, wherein
   a first parity page is computed as an XOR of a first data page, a second data page multiplied by $\alpha^2$, a third data page multiplied by $\alpha^4$, a fourth data page multiplied by $\alpha^6$, and so on, up to data page n−3 multiplied by $\alpha^{2(n-4)}$, where $\alpha$ is a root of a polynomial of degree z−1;
   a second parity page is computed as an XOR of a first data page, a second data page multiplied by $\alpha$, a third data page multiplied by $\alpha^2$, a fourth data page multiplied by $\alpha^3$, and so on, up to data page n−3 multiplied by $\alpha^{n-4}$ and the first parity page multiplied by $\alpha^{n-3}$; and
   a third parity page is computed as an XOR of the n−3 data pages with the first and second parity pages.

5. The system of claim 1, wherein the storage devices are one of hard disk drives and flash drives.

* * * * *